United States Patent
Kiuchi et al.

(10) Patent No.: US 7,064,517 B2
(45) Date of Patent: Jun. 20, 2006

(54) MOTOR DRIVING APPARATUS FOR USE IN A DISHWASHER

(75) Inventors: Mitsuyuki Kiuchi, Nara (JP); Masahiro Suzuki, Osaka (JP); Hideki Nakata, Osaka (JP); Kaneharu Yoshioka, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/997,916

(22) Filed: Nov. 29, 2004

(65) Prior Publication Data
US 2005/0127865 A1   Jun. 16, 2005

(30) Foreign Application Priority Data
Dec. 11, 2003   (JP) ............................. 2003-412988

(51) Int. Cl.
*H02P 27/04* (2006.01)
(52) U.S. Cl. ...................... 318/802; 318/800; 318/812; 318/813
(58) Field of Classification Search ................ 318/254, 318/439, 779, 110; 68/12.16, 12.02, 24
See application file for complete search history.

(56) References Cited

U.S. PATENT DOCUMENTS

| | | | |
|---|---|---|---|
| 6,191,545 B1 * | 2/2001 | Kawabata et al. | 318/439 |
| 6,249,094 B1 * | 6/2001 | Zeh et al. | 318/254 |
| 6,337,548 B1 * | 1/2002 | Kawabata et al. | 318/439 |
| 6,479,956 B1 * | 11/2002 | Kawabata et al. | 318/254 |
| 6,615,619 B1 * | 9/2003 | Kakuda et al. | 68/24 |
| 6,737,828 B1 * | 5/2004 | Kiuchi et al. | 318/779 |
| 6,748,618 B1 * | 6/2004 | Darby et al. | 8/159 |
| 6,778,868 B1 * | 8/2004 | Imamura et al. | 700/79 |
| 2001/0019249 A1 * | 9/2001 | Kato et al. | 318/254 |
| 2002/0032491 A1 * | 3/2002 | Imamura et al. | 700/79 |
| 2002/0189301 A1 * | 12/2002 | Hosoito et al. | 68/12.02 |
| 2003/0020431 A1 * | 1/2003 | Kiuchi et al. | 318/779 |
| 2003/0140427 A1 * | 7/2003 | Yamamoto et al. | 8/159 |
| 2003/0155875 A1 * | 8/2003 | Weinmann | 318/110 |
| 2005/0160771 A1 * | 7/2005 | Hosoito et al. | 68/12.16 |

FOREIGN PATENT DOCUMENTS

JP    2003-190070    7/2003

* cited by examiner

*Primary Examiner*—Paul Ip
(74) *Attorney, Agent, or Firm*—Bacon & Thomas, PLLC

(57) ABSTRACT

An apparatus for driving a motor of a dishwasher includes an AC power source, a rectification circuit for converting an AC power from the AC power source to a DC power, an inverter circuit for converting the DC power from the rectification circuit to an AC power, a motor driven by the inverter circuit to drive a wash pump and/or a drain pump, a current detector for detecting an output current of the inverter circuit, and a controller for performing a PWM (pulse width modulation) control of the inverter circuit based on an output signal of the current detector to thereby control the motor to rotate at a set rotation speed. A phase difference between an output voltage and the output current of the inverter circuit or a reactive current is controlled to have a predetermined value.

3 Claims, 13 Drawing Sheets

FIG.12

| WASHING / DRAINING OPERATION | ROTATION SPEED | V/f SETTING VALUE | $I\sin\phi$ SETTING VALUE | AIR INFLOW DETECTION LEVEL |
|---|---|---|---|---|
| WASHING | N1 | kv 1 | Irs 1 | Ima 1 |
| WASHING | N2 | kv 2 | Irs 2 | Ima 2 |
| WASHING | N3 | kv 3 | Irs 3 | Ima 3 |
| DRAINING | N4 | kv 4 | Irs 4 | Ima 4 |
| DRAINING | N5 | kv 5 | Irs 5 | Ima 5 |
| DRAINING | N6 | kv 6 | Irs 6 | Ima 6 |

MOTOR DRIVING APPARATUS FOR USE IN A DISHWASHER

FIELD OF THE INVENTION

The present invention relates to a dishwasher for cleaning household dishware.

BACKGROUND OF THE INVENTION

Conventionally, with regard to a motor driving apparatus for use in a dishwasher, it is required to reduce the size of a pump motor by employing a sensorless brushless motor driven by an inverter (see, for example, Japanese Patent Laid-open Application No. 2003-190070).

In the above configuration, however, since a motor induced voltage should be obtained for the detection of a position of a rotor, a motor driving method such as a rectangular wave driving may be employed. As a result, there has been a problem that waveform distortion of a motor current and a noise of the motor are increased.

On the other hand, if a motor is driven not on a sensorless driving method but on the basis of a position sensor signal, a position sensor has to be installed within the motor, which would result in an increase in both the thickness and the price of the motor, while deteriorating the reliability thereof.

SUMMARY OF THE INVENTION

It is, therefore, an object of the present invention to provide a pump motor with a reduced noise by sensorlessly driving a motor with a sine wave, wherein a position sensor is removed to make the motor thinner, smaller and cheaper, thereby enhancing reliability thereof.

In accordance with the present invention, there is provided an apparatus for driving a motor of a dishwasher including: an AC power source; a rectification circuit for converting an AC power from the AC power source to a DC power; an inverter circuit for converting the DC power from the rectification circuit to an AC power; a motor driven by the inverter circuit to drive a wash pump and/or a drain pump; a current detector for detecting an output current of the inverter circuit; and a controller for performing a PWM (pulse width modulation) control of the inverter circuit based on an output signal of the current detector to thereby control the motor to rotate at a set rotation speed, wherein a phase difference between an output voltage and the output current of the inverter circuit or a reactive current may be controlled to have a predetermined value. By eliminating a position sensor, the size of the motor can be reduced, while improving the reliability thereof and realizing a reduction in the production cost thereof.

In the above configuration, the inverter circuit can be configured as a three phase full-bridge inverter circuit including six transistors and six diodes, and the current detector can include shunt resistors respectively connected to negative potential terminals of lower arm transistors of the three phase full-bridge inverter circuit, wherein the output current of the inverter circuit can be detected by detecting a current flowing through the shunt resistors. Therefore, since it becomes easier to detect a DC component and to configure the current detector by using the shunt resistors of low price, the current detector can be designed to have a small size and a low-price sensorless motor driving apparatus can be obtained.

In the above configuration, the motor may be a position-sensorless brushless DC motor having a planar shape. Therefore, the motor can be reduced in its size and can be configured to have a planar shape because it does not incorporate a position sensor therein. As a result, installation area for the motor in a bottom portion of a washer tub can be reduced, which in turn increases the volume of the portion in the washer tub for accommodating dishware. Thus, a large-capacity for dishwasher can be realized.

In the above configuration, the output current of the inverter circuit and an induced voltage of the motor may be controlled to have a substantially identical phase by way of controlling the phase between the output voltage and the output current of the inverter circuit or the reactive current to have the predetermined value. By setting the phase of the induced voltage and the phase of the motor current to be substantially identical, the motor current can be reduced, thereby enabling operation of maximum efficiency. Furthermore, since a rise in the temperature of the motor can be reduced, the size and thickness of the motor can be reduced. As a result, the installation area for the motor can be further reduced such that the volume of the portion in the washer tub for accommodating dishware can be increased, while realizing a large-capacity compact dishwasher at a low price.

In the above configuration, the output current of the inverter circuit may be controlled to lead the induced voltage of the motor by way of controlling the phase difference between the output voltage and the output current of the inverter circuit or the reactive current to have the predetermined value. By this configuration, the control can be stabilized even in case the phase of current is changed due to a variation in a load on the motor because the phase of the current does not lag with respect to that of the induced voltage to thereby prevent a reduction of a torque and a stop of the motor. Therefore, stable operation of the motor can be achieved even when there occurs a sudden change in the load thereon, such as an inflow of air into a pump, and, at the same time, a high-speed operation can be realized by a weak field control even for a multi-polar motor.

In the above configuration, the phase difference between the output voltage and the output current of the inverter circuit or the reactive current may be controlled to have the predetermined value by way of detecting the output current of the inverter circuit by means of the current detector in synchronous with a switching period for the PWM control of the inverter circuit and comparing a value of the output current detected by the current detector with a value of an output current that is calculated and set in synchronous with the switching period. Thus, detection of the phase of the motor current, the reactive current or an absolute value of current becomes feasible by using a carrier frequency higher than a motor driving frequency, and it becomes possible to cope with the change in the load of the motor by reducing a time period required to respond to a motor control. As a result, stable operation can be achieved even when there occurs a sudden change of the load on the motor, such as an inflow of air.

In the above configuration, a wash pump operation or a drain pump operation may be enabled by allowing the motor to make forward or backward rotations, and an inflow of air in the wash pump or the drain pump can be detected if the output current of the inverter circuit falls below a preset value while driving the wash pump or the drain pump by controlling the motor to rotate at a set rotation speed. In order to prevent increase of noise when the inflow of air is detected, the rotation speed of the motor may be reduced or the quantity of wash water may be increased. Further, during a drain operation, by temporarily stopping the operation of the drain pump until wash water is collected in a lower portion of the washer tub and resuming the operation of the drain pump, the operating time can be reduced, thereby lowering the generation of noise.

BRIEF DESCRIPTION OF THE DRAWINGS

The above and other objects and features of the present invention will become apparent from the following description of preferred embodiments given in conjunction with the accompanying drawings, in which:

FIG. 12 shows a control table corresponding to a rotation speed of the motor driving apparatus for use in the dishwasher in accordance with the present invention.

DETAILED DESCRIPTION OF THE PREFERRED EMBODIMENTS

Figure 1:
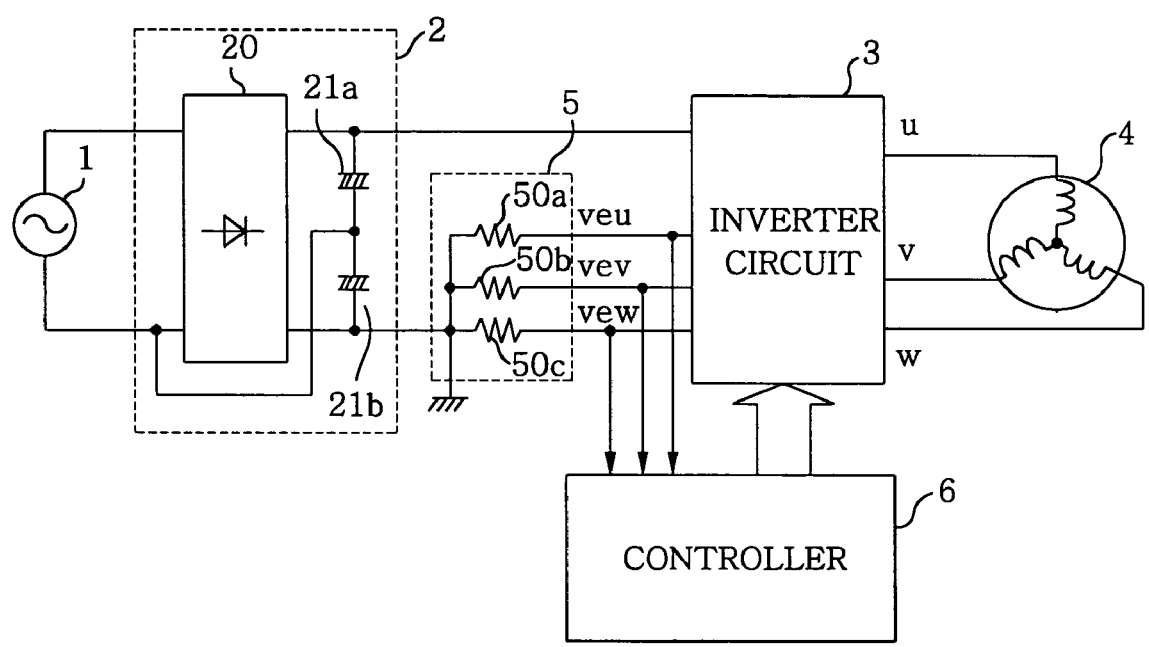
FIG. 1 is a block diagram of a motor driving apparatus for use in a dishwasher in accordance with a first preferred embodiment of the present invention.

Referring to FIG. 1, there is provided a block diagram of a motor driving apparatus incorporated in a dishwasher in accordance with a first preferred embodiment of the present invention.

In FIG. 1, an AC power supplied from AC power source 1 is converted to a DC power by rectification circuit 2, and the DC power is converted to a three phase AC power by inverter circuit 3 in order to drive motor 4. With regard to rectification circuit 2, by connecting capacitors 21a and 21b between DC output terminals of full-wave rectification circuit 20 in series and coupling a connection node between two capacitors 21a and 21b to one of AC power input terminals of full-wave rectification circuit 20, rectification circuit 2 is configured as a DC voltage doubler circuit which serves to increase voltage applied to the inverter circuit 3. Further, current detector 5, which is connected to a negative voltage side of inverter circuit 3, detects respective currents flowing through three phase lower arms of inverter circuit 3 to thereby detect output currents of inverter circuit 3, i.e., respective three phase currents of motor 4.

Controller 6 calculates the output current of inverter circuit 3 from an output signal of current detector 5, and rotates motor 4 by applying a power of a predetermined frequency and a preset voltage to motor 4 corresponding to a set rotation speed of motor 4. At this time, by controlling a phase of an output current with respect to an output voltage or a reactive current according to a load on motor 4, motor 4 can be made to rotate at a set synchronous speed.

Figure 2:
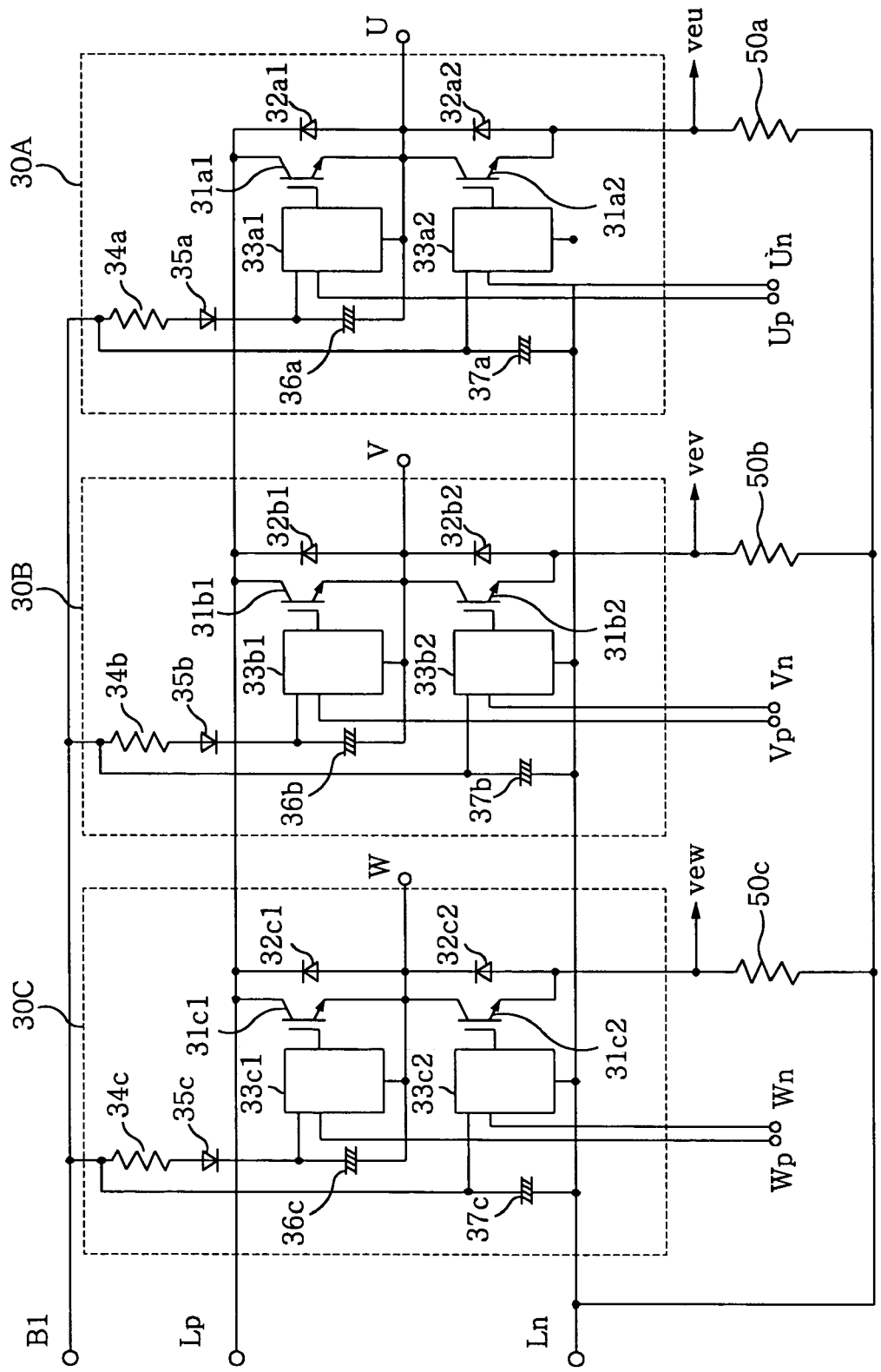
FIG. 2 shows an inverter circuit of the motor driving apparatus in accordance with the first preferred embodiment of the present invention.

FIG. 2 is a detailed circuit diagram of inverter circuit 3, which is configured as a three phase full-bridge inverter circuit including six transistors and six diodes. Here, U phase arm 30A, which is one of three phase arms, will be described. An upper parallel connection unit including upper arm transistor 31a1 and anti-parallel diode 32a1 that are connected in parallel to each other and a lower parallel connection unit including lower arm transistor 31a2 and anti-parallel diode 32a2 that are connected in parallel to each other are coupled to each other in series, wherein each of upper and lower arm transistor 31a1 and 31a2 is made up of an insulated gate bipolar transistor (hereinafter, refereed to as an IGBT). A collector terminal of upper arm transistor 31a1 is connected to a positive potential terminal Lp of a DC power source while an emitter terminal thereof is coupled to output terminal U of inverter circuit 3. Further, an emitter terminal of lower arm transistor 31a2 is connected to negative potential terminal Ln of the DC power source via shunt resistor 50a which forms current detector 5.

Upper arm transistor 31a1 is driven by upper arm gate driving circuit 33a1 based on upper arm driving signal Up while lower arm transistor 31a2 is on-off operated by lower arm gate driving circuit 33a2 in accordance with lower arm driving signal Un. Upper arm gate driving circuit 33a1, which incorporates therein an RS flip-flop circuit that is set and rest by a differential signal, on-operates upper arm transistor 31a1 when upper arm driving signal Up rises, whereas it off-operates upper arm transistor 31a1 when upper arm driving signal Up falls. Lower arm gate driving circuit 33a2 does not include an RS flip-flop circuit because it is unnecessary therein.

A voltage of 10V to 15V is required as a gate applied voltage of IGBT. When lower arm transistor 31a2 is turned on, bootstrap capacitor 36a is charged via bootstrap resistor 34a and bootstrap diode 35a from positive terminal B1 of a DC power supply of 15 V, so that it becomes possible to switch upper arm transistor 31a1 on and off by using the energy accumulated in bootstrap capacitor 36a. Further, bootstrap capacitor 36a may also be charged when anti-parallel diode 32a2 of the lower arm is conducted.

V phase arm 30B and W phase arm 30C also have same connection structures, and emitter terminals of lower arm transistors of V phase arm 30B and W phase arm 30C are coupled to shunt resistors 50b and 50c, respectively, which are elements of current detector 5 and are in turn connected to negative potential terminal Ln of the DC power source. It is possible to switch on and off the lower arm transistors by controlling a gate voltage thereof if the lower arm transistors are formed of IGBT's or power MOSFET's. Thus, by setting resistance values of the shunt resistors, which are connected to emitter terminals of IGBT's or source terminals of power MOSFET's, such that their voltages are smaller than 1V, the lower arm transistors can be switched on and off through a voltage control without causing any substantial influence on the switching operations of the lower arm transistors. Further, by detecting voltages veu, vev and vew of shunt resistors 50a, 50b and 50c, respectively, an output current of inverter circuit 3, i.e., a motor current, can be obtained.

Figure 3:
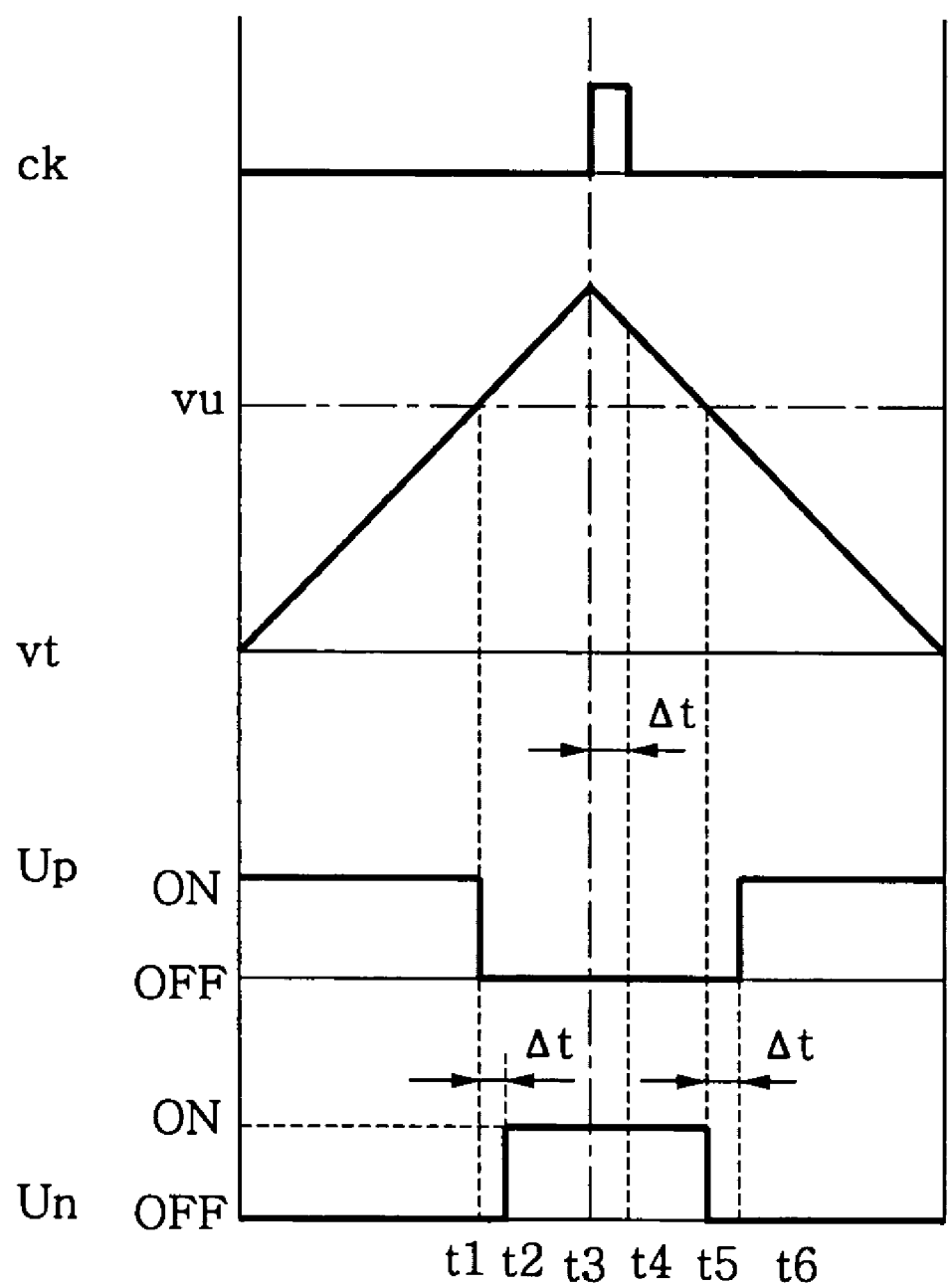
FIG. 3 sets forth a time chart that describes a detection of a current of the motor driving apparatus in accordance with the first preferred embodiment of the present invention.

FIG. 3 shows a detection timing of an inverter circuit output current, wherein the motor is controlled by a PWM control by using a triangular wave modulation signal. The inverter circuit output current is detected by performing a high-speed A/D conversion of voltages veu, vev and vew by means of a motor control processor such as a microcomputer, wherein the A/D conversion is performed during a time duration far from switching timings of the upper and the lower arm IGBT's in order to reduce the influence of switching noises.

In FIG. 3, ck represents a peak value of triangular wave modulation signal Vt, i.e., a synchronization signal generated at time t3, and vu refers to a U phase voltage control signal. By comparing triangular wave modulation signal Vt and U phase voltage control signal vu, driving signal Up for U phase upper arm transistor 31a1 and driving signal Un for U phase lower arm transistor 31a2 are generated. During time periods from t1 to t2 and from t5 to t6, the upper and the lower arm transistors are not operated in the on-state, so that the time periods from t1 to t2 and from t5 to t6 are referred to as dead time Δt. Preferably, timing for the A/D conversion may be t3 when the lower arm transistor is in on-state while the upper arm transistor is in off-state or between t3 to t4, wherein the interval from t3 to t4 may be equivalent to the dead time Δt.

Figure 4:
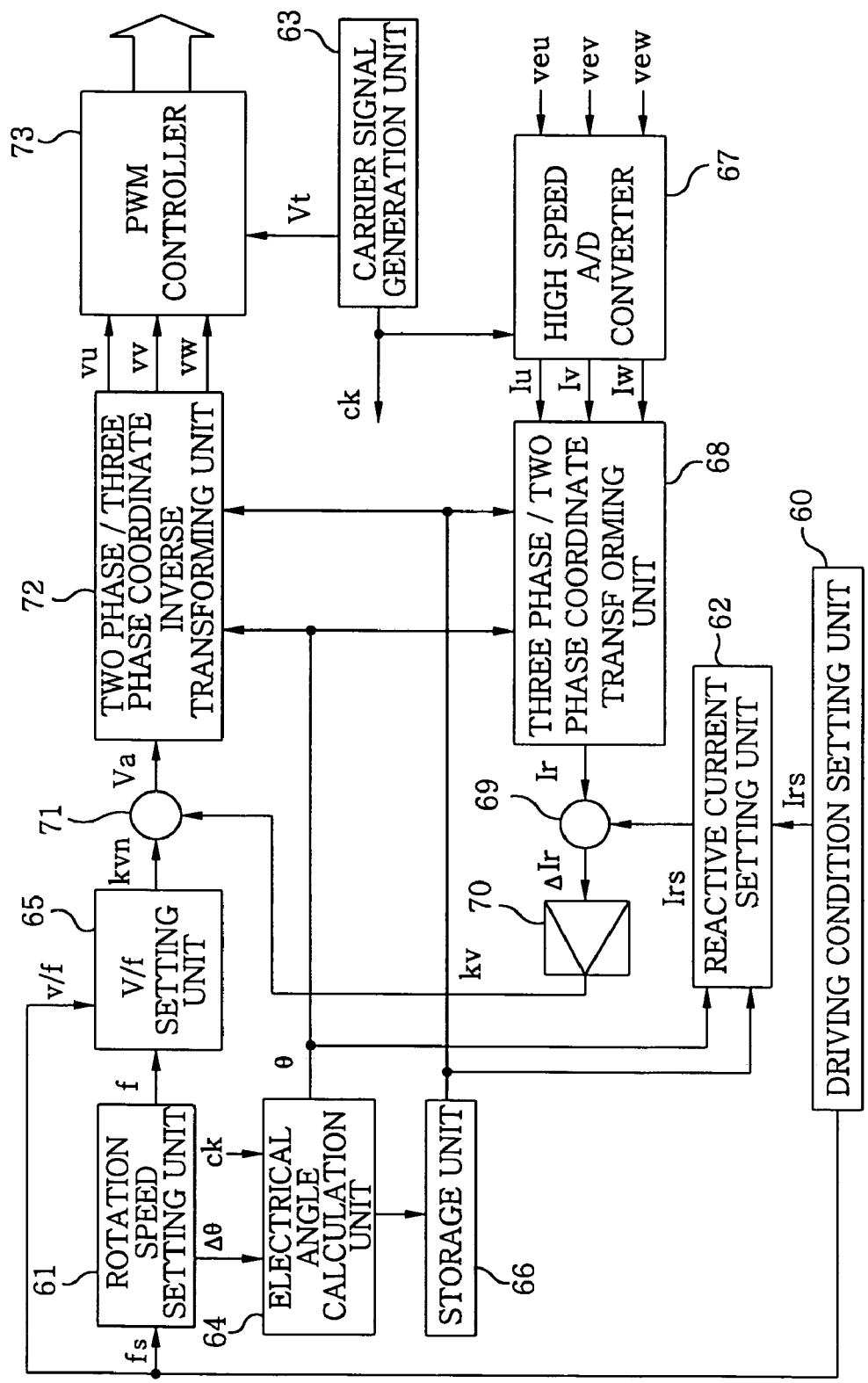
FIG. 4 depicts a block diagram of a controller of the motor driving apparatus in accordance with the first preferred embodiment of the present invention.

Referring to FIG. 4, there is provided a block diagram of a controller in accordance with the present invention. A sensorless sine wave driving of a motor is realized by using a microcomputer or a high-speed processor such as a digital signal processor.

Figure 5:
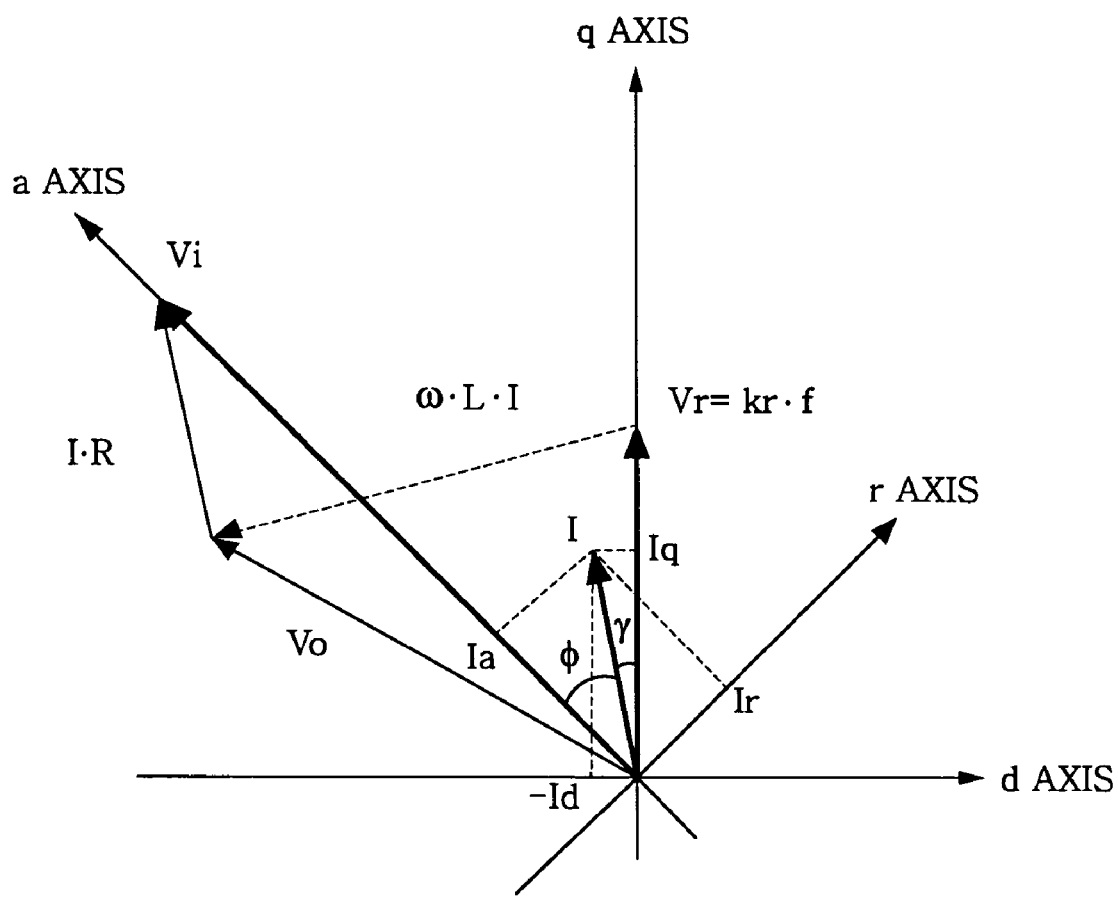
FIG. 5 is a control vector diagram of the motor driving apparatus in accordance with the first preferred embodiment of the present invention.

A basic control method will be described with reference to a vector diagram shown in FIG. 5. FIG. 5 is a d-q coordinates vector diagram of a surface permanent magnet motor (simply referred to as a SPM) having a permanent magnet disposed on a surface of a rotor. Induced voltage Vr of the motor is represented on a q axis, and induced voltage Vr is proportional to a rotation speed N, i.e., motor driving frequency f with motor induced voltage constant kr. In other words, a ratio of motor induced voltage Vr to frequency f (Vr/f) is a constant.

If motor current I is controlled on the q axis, a vector control would be performed. Since, however, the q axis cannot be detected, it is assumed that motor current I has lead angle γ with respect to the q axis. Since a voltage equation of a motor is expressed as Equation 1, motor applied voltage vector Vi gets fixed if current vector I is fixed at a time when driving frequency f is fixed in the d-q coordinates. Conversely, if motor applied voltage vector Vi is fixed, current vector I is fixed. This relationship is still valid when the d-q coordinates are transformed to a-r coordinates in which motor applied voltage vector Vi (baseline axis) serves as a main axis. Thus, if current vector I is fixed, motor induced voltage vector Vr is also fixed. In other words, if motor constants (coil resistance R, coil inductance L, motor induced voltage constant kr) are known, the phase of current vector I and induced voltage Vr can be controlled constant by way of fixing current vector I. Therefore, q-axis current Iq (i.e., a torque current) can be controlled substantially constant, enabling a virtual vector control to be accomplished.

$$Vi = (R + j\omega L)I + Vr \qquad \text{(Equation 1)}$$

(R, w, L represent a coil resistance, an angular frequency and a coil inductance, respectively)

By setting reactive current I sin φ to have an appropriate value and reducing lead angle γ, motor current vector I becomes substantially identical to torque current (q-axis current) Iq. As a result, high-efficiency operation of the motor can be realized, and a loss in the motor is reduced to thereby lower a rise in the temperature of the motor, so that the size of the motor can be reduced.

Furthermore, by setting motor current vector I to have lead angle γ during a normal operation, stop of the motor, which occurs owing to a sudden decrease of the motor torque caused by a lag of angle γ with respect to the q axis, can be prevented even though phase φ is changed due to a sudden change in a load on the motor. Particularly, the probability of the stop of the motor increases if angle γ lags with respect to the q axis and, especially, phase φ has a value equal to or greater than 90° due to a sudden reduction in the rotation speed of the motor. Therefore, the safety of the rotation control can be improved by reducing the probability of the phase lagging by way of performing the lead angle control.

Moreover, since a weak field control (in which a current of the d axis becomes negative) is executed by performing the lead angle control, voltage vector Vo of the sum of motor induced voltage Vr and coil voltage jωL1 can be reduced, which in turn renders it possible to increase torque current Iq to thereby accomplish a high-speed rotation of the motor.

As described above, if the motor constants (coil resistance R, coil inductance L, and motor induced voltage constant kr) and torque current Iq corresponding to the load on the motor are known, an absolute value and phase φ of inverter current (motor current) I with respect to motor induced voltage Vi can be controlled in order to control the motor current vector. Therefore, as shown in the vector diagram of FIG. 5, r-axis current Ir(=I sin φ) or a-axis current Ia (=I cos φ) may be controlled to have a predetermined value after the transformation of coordinates from the d-q coordinates to the a-r coordinates.

Referring back to FIG. 4, driving condition setting unit 60 sends setting signals fs, Irs and V/f to rotation speed setting unit 61, reactive current setting unit 62 and V/f setting unit 65, such that rotation speed setting unit 61 and reactive current setting unit 62 can obtain a driving rotation speed, a torque current and lead angle γ in accordance with motor driving conditions in order to set driving frequency f and reactive current I sin φ. Carrier signal generation unit 63 generates synchronization signal ck and triangular wave signal Vt for a PWM, and a carrier frequency (switching frequency) is in a supersonic frequency range not smaller than 15 kHz in order to reduce motor noises. Synchronization signal ck is transmitted to each operation block, and each operation block operates in synchronous with synchronization signal ck.

Rotation speed setting unit 61 sets motor driving frequency f and obtains phase angle Δθ of carrier signal period Tc to transmit phase angle Δθ to electrical angle calculation unit 64, and sends driving frequency signal f to V/f setting unit 65. Electrical angle calculation unit 64 obtains phase θ in synchronous with synchronization signal ck and transmits thus obtained phase θ to storage unit 66 for storing therein a standardized sine wave table, transforming units 68 and 72 and reactive current setting unit 62.

V/f setting unit 65 sets applied voltage constant kvn based on driving frequency f or a load torque. Here, applied voltage constant kvn is proportional to the rotation speed or the load torque. In case of a pump motor, since the load torque increases by the square of the rotation speed, applied voltage constant kvn should be increased in proportion to the square of driving frequency f. As will be described later, in case of performing a washing operation through a forward rotation of the motor and a draining operation through a backward rotation of the motor by employing a one-motor-two-pump type mechanism or one-motor-one-pump type mechanism, a torque current required in the motor has also to be changed with the alternation of the forward rotation and the backward rotation. Therefore, applied voltage constant kvn needs to have different values for the forward rotation and the backward rotation, respectively.

Storage unit 66 stores therein a standardized sine wave table which is required to perform a calculation of a trigonometric function corresponding to a phase angle. For example, storage unit 66 has a sine wave table containing therein sine wave data ranging from −1 to 1 corresponding to phases from 0 to $2\pi$.

High speed A/D converter 67 converts output signals veu, vev, vew from current detector 5 to digital signals Iu, Iv, Iw corresponding to inverter output currents for a short time less than several micro seconds at the peak value of triangular wave modulation signal Vt as shown in the time chart of FIG. 3. Thereafter, high speed A/D converter 67 transmits the instantaneous value of each phase current to three phase/two phase coordinate transforming unit 68.

Three phase/two phase coordinate transforming unit 68 performs a three phase/two phase transformation on instantaneous values of the inverter circuit output currents to carry out the coordinates transformation to an axis of inverter circuit output voltage, i.e., a motor baseline axis and an orthogonal oriented axis (the a-r coordinates), as shown in FIG. 5. At this time, a coordinate transformation is performed by using Equation 2, such that a-axis component Ia and r-axis component Ir are obtained. Here, Ir corresponds to I sin φ, and becomes a reactive current component with respect to the inverter circuit output voltage (baseline voltage). By carrying out the transformation of coordinates, not only reactive current component Ir but also an absolute value of output current vector Im can be obtained instantaneously from the instantaneous value of the inverter circuit output current by using a mean-square Equation 3. Furthermore, since current phase φ with respect to the inverter circuit output voltage (baseline voltage) can also be attained instantaneously by using Equation 4, responsiveness is greatly improved compared to a case of detecting a phase by means of a current zero cross detecting unit.

$$\begin{bmatrix} Ir \\ Ia \end{bmatrix} = \begin{bmatrix} \cos\theta & \sin\theta \\ -\sin\theta & \cos\theta \end{bmatrix} \times \qquad \text{(Equation 2)}$$

$$\sqrt{\frac{2}{3}} \begin{bmatrix} 1 & -\frac{1}{2} & -\frac{1}{2} \\ 0 & \frac{\sqrt{3}}{2} & -\frac{\sqrt{3}}{2} \end{bmatrix} \begin{bmatrix} Iu \\ Iv \\ Iw \end{bmatrix}$$

$$= \sqrt{\frac{2}{3}} \begin{bmatrix} \cos\theta & \cos\left[\theta - \frac{2\pi}{3}\right] & \cos\left[\theta - \frac{4\pi}{3}\right] \\ -\sin\theta & -\sin\left[\theta - \frac{2\pi}{3}\right] & -\sin\left[\theta - \frac{4\pi}{3}\right] \end{bmatrix} \begin{bmatrix} Iu \\ Iv \\ Iw \end{bmatrix}$$

$$Im = \sqrt{Ia^2 + Ir^2} \qquad \text{(Equation 3)}$$

$$\phi = \tan^{-1}(Ir/Ia) \qquad \text{(Equation 4)}$$

Reactive current comparing unit 69 compares output signal Ir from three phase/two phase coordinate transforming unit 68 with setting signal Irs from reactive current setting unit 62 to thereby output error signal ΔIr. Then, error signal amplifying unit 70 amplifies or integrates error signal ΔIr and outputs applied voltage constant change signal kv to control voltage comparing and setting unit 71.

Control voltage comparing and setting unit 71 compares output signal kvn of V/f setting unit 65 with output signal kv of error signal amplifying unit 70 to thereby generate inverter output voltage control signal Va for controlling an inverter output voltage such that reactive current component Ir has a predetermined value. Inverter output voltage control signal Va is then transmitted to two phase/three phase coordinate inverse transforming unit 72.

Two phase/three phase coordinate inverse transforming unit 72 generates three phase sine wave voltage signals by using Equation 5 for an inverse transformation. Since inverter output voltage Vi is on the a-axis and r-axis component Vr' is zero, it is only required to calculate Va. Then, three phase voltages vu, vv, vw are outputted to a PWM controller 73.

$$\begin{bmatrix} Vu \\ Vv \\ Vw \end{bmatrix} = \sqrt{\frac{2}{3}} \begin{bmatrix} 1 & 0 \\ -\frac{1}{2} & \frac{\sqrt{3}}{2} \\ -\frac{1}{2} & -\frac{\sqrt{3}}{2} \end{bmatrix} \begin{bmatrix} \cos\theta & -\sin\theta \\ \sin\theta & \cos\theta \end{bmatrix} \begin{bmatrix} Vr' \\ Va \end{bmatrix} \qquad \text{(Equation 5)}$$

$$= \sqrt{\frac{2}{3}} \begin{bmatrix} \cos\theta & -\sin\theta \\ \cos\left[\theta - \frac{2\pi}{3}\right] & -\sin\left[\theta - \frac{2\pi}{3}\right] \\ \cos\left[\theta - \frac{4\pi}{3}\right] & -\sin\left[\theta - \frac{4\pi}{3}\right] \end{bmatrix} \begin{bmatrix} Vr' \\ Va \end{bmatrix}$$

Figure 6:
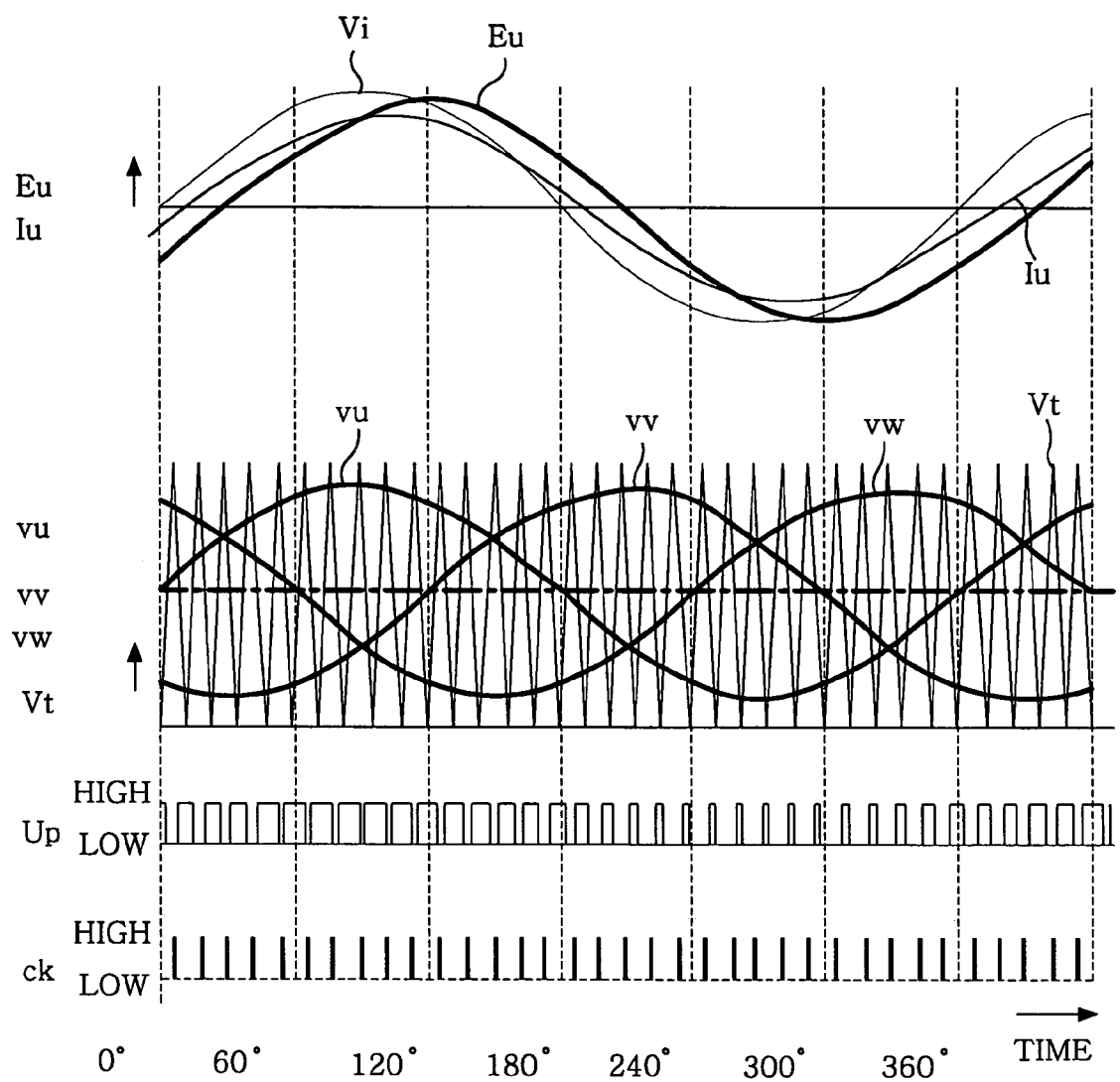
FIG. 6 shows a time chart that describes a waveform of each part of the motor driving apparatus in accordance with the first preferred embodiment of the present invention.

Referring to FIG. 6, there is provided a time chart that describes a waveform of each part obtained by the PWM control.

Eu is a waveform of a motor induced voltage viewed from a neutral point and Iu is a waveform of a U phase current, wherein Iu leads motor induced voltage Eu slightly. vu, vv and vw are PWM control input signals for U phase, V phase and W phase, respectively, i.e., output signals of two phase/three phase coordinate inverse transforming unit 72. By comparing vu, vv and vw with triangular wave modulation signal Vt, PWM control output signal Up is generated. Signal vu and U phase output voltage Vi have a same phase, and U phase current Iu lags signal vu by phase φ.

Figure 7:
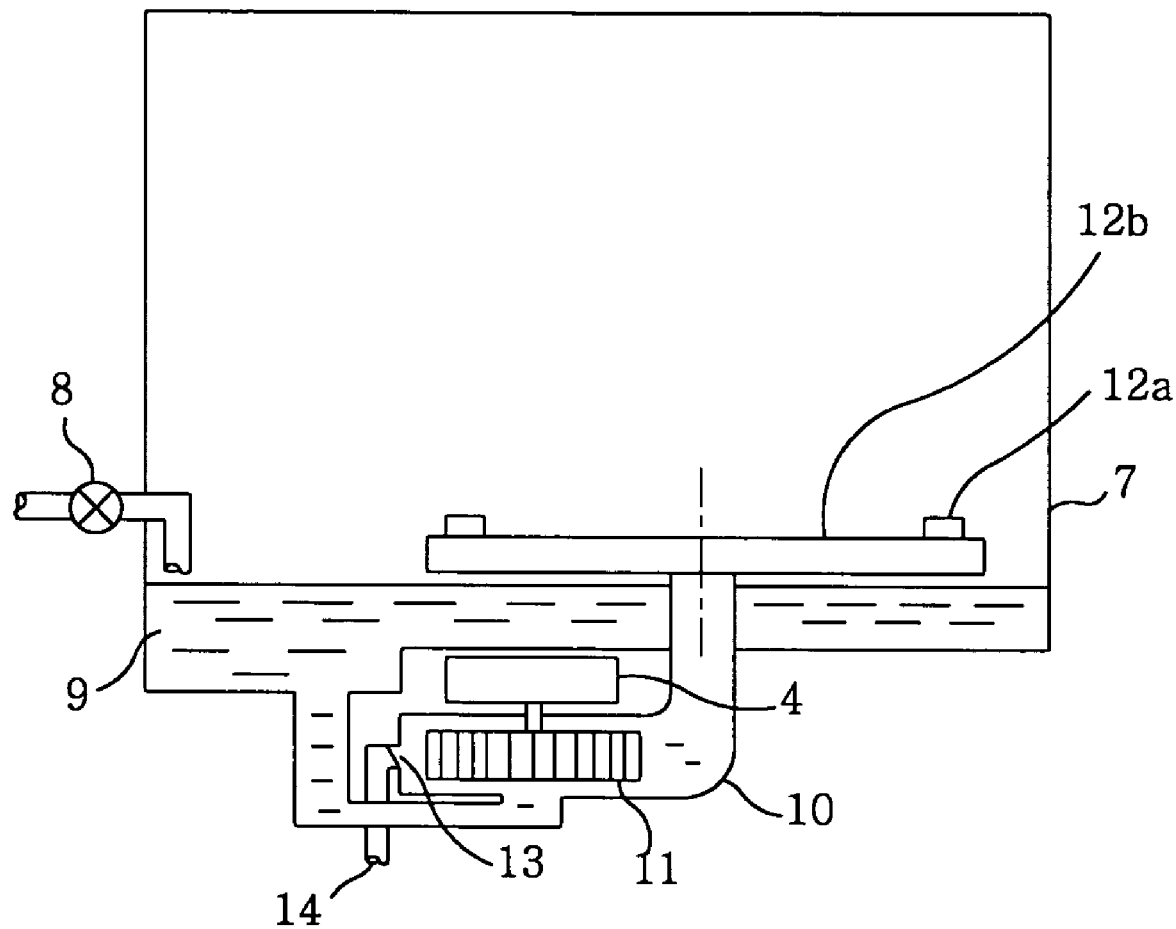
FIG. 7 illustrates a cross sectional view of the motor driving apparatus for use in the dishwasher in accordance with the first preferred embodiment of the present invention.

FIG. 7 schematically illustrates a dishwasher which employs a one-motor-one-pump type structure. By supplying tap water to washer tub 7 via water supply valve 8, wash water 9 is stored in washer tub 7. Planar-shape brushless DC motor 4 is disposed at a lower portion of washer tub 7 such that its axis is vertically oriented. Further, pump case 10 is installed below motor 4. By forwardly rotating impeller 11, since a pressure is applied toward a centrifugal direction from an axial direction of motor 4, wash water is jetted from injection blades 12b having injection nozzle 12a toward dishware (not shown), thereby cleaning the dishware. That is, when impeller 11 is forwardly rotated, the internal pressure of pump case 10 is increased while making water drain valve 13 installed at a lateral portion of pump case 10 closed, so that the direction of water currents is oriented toward injection blades 12b. When impeller 11 is backwardly rotated, however, a pressure is applied toward a vertical direction from a lateral side of impeller 11, rendering water drain valve 13 opened. As a result, the water currents in the vertical direction become to flow toward the direction of water drain pipe 14. Thus, by the above-described configuration, both of a washing operation and a water draining operation can be performed by using only one motor and one pump. Though it is also possible to carry out a washing operation through forward rotation and a water draining operation through backward rotation even in case of employing a one-motor-two-pump type structure in which an impeller and a pump case are prepared for each of the washing operation and the water draining operation, the height of the pumps is increased, rendering it impossible to reduce the volume of the lower portion of washer tub 7.

In accordance with the present invention, since a position sensor of the brushless DC motor can be eliminated, the thickness of the motor with the planar structure can be further reduced. By combining this feature with the one-motor-one-pump mechanism, the volume of the lower portion of the washer tub can be reduced, so that the volume of the portion of the washer tub for accommodating therein dishware can be increased. Moreover, if the output of the motor is identical, the size of brushless DC motor 4 can be further reduced by increasing the rotation speed thereof. Therefore, by increasing the rotation speed of the impeller, respective sizes of the pump shape and the motor shape can be reduced.

SECOND PREFERRED EMBODIMENT

Figure 8:
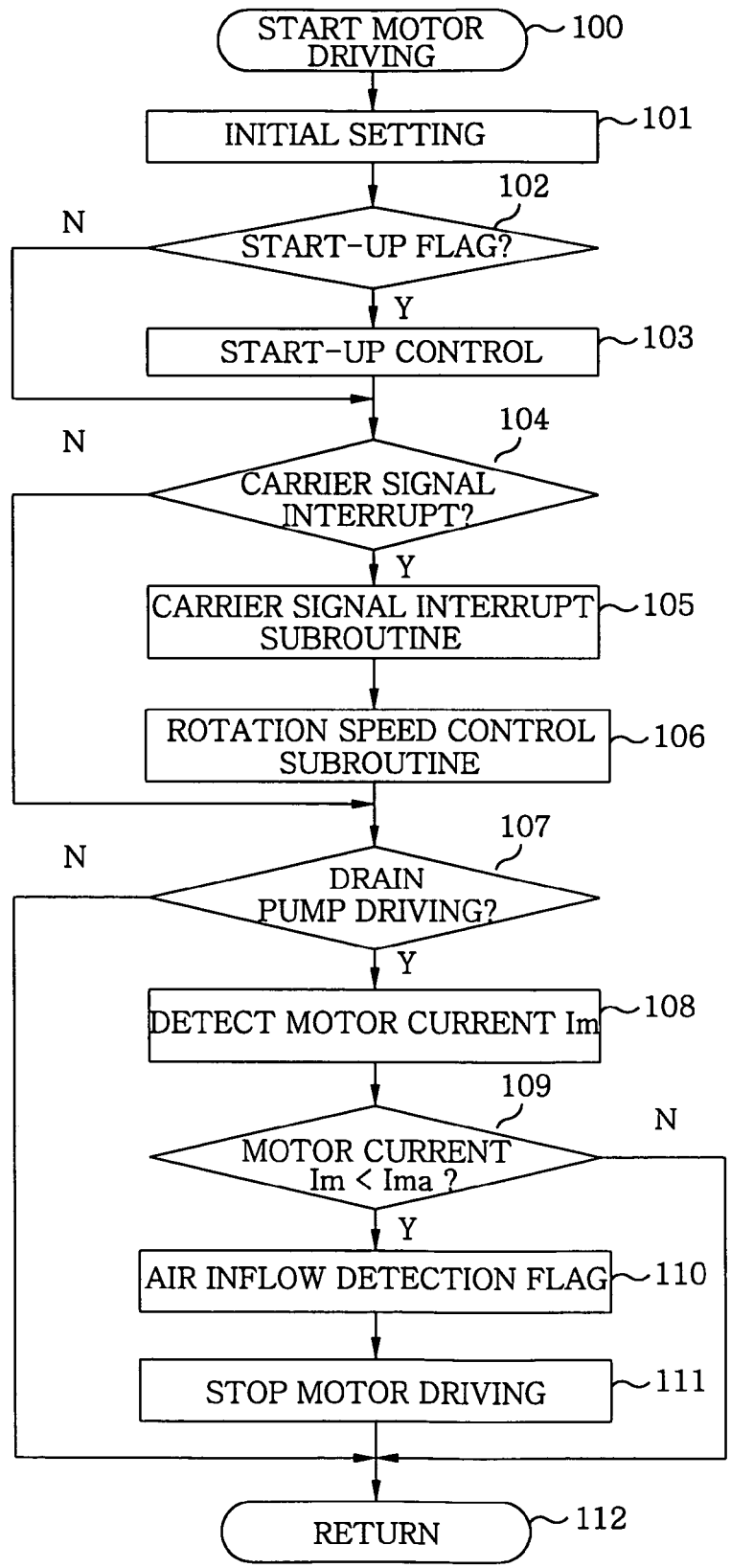
FIG. 8 presents a flowchart that describes a motor control program in accordance with a second preferred embodiment of the present invention.

FIG. 8 is a flow chart of a motor control program that describes the operation of the motor driving apparatus for use in the dishwasher in accordance with the present invention.

A motor driving program is started in step 100, and setting of various parameters, e.g., a driving frequency, a ratio of V/f, and a reactive current is performed in step 101. Then, it is determined whether a motor's operation is a start-up operation in step 102, and, if so, a start-up control subroutine is executed in step 103.

The start-up control subroutine 103 is for linearly increasing driving frequency f from 0 to set frequency fs. Depending on driving frequency f, a V/f control and a setting value for reactive current Irs are varied. As for a pump load, the load torque is changed by the square of the rotation speed. Thus, a stable driving control can be performed by obtaining torque current Iq corresponding to a rotation speed, calculating I sin φ and performing a driving control with reference to a control table.

Next, it is determined whether there exists a carrier signal interrupt in step 104. If there is a carrier signal interrupt, a carrier signal interrupt subroutine and a rotation speed control subroutine are carried out in step 105 and step 106, respectively.

Figure 9:
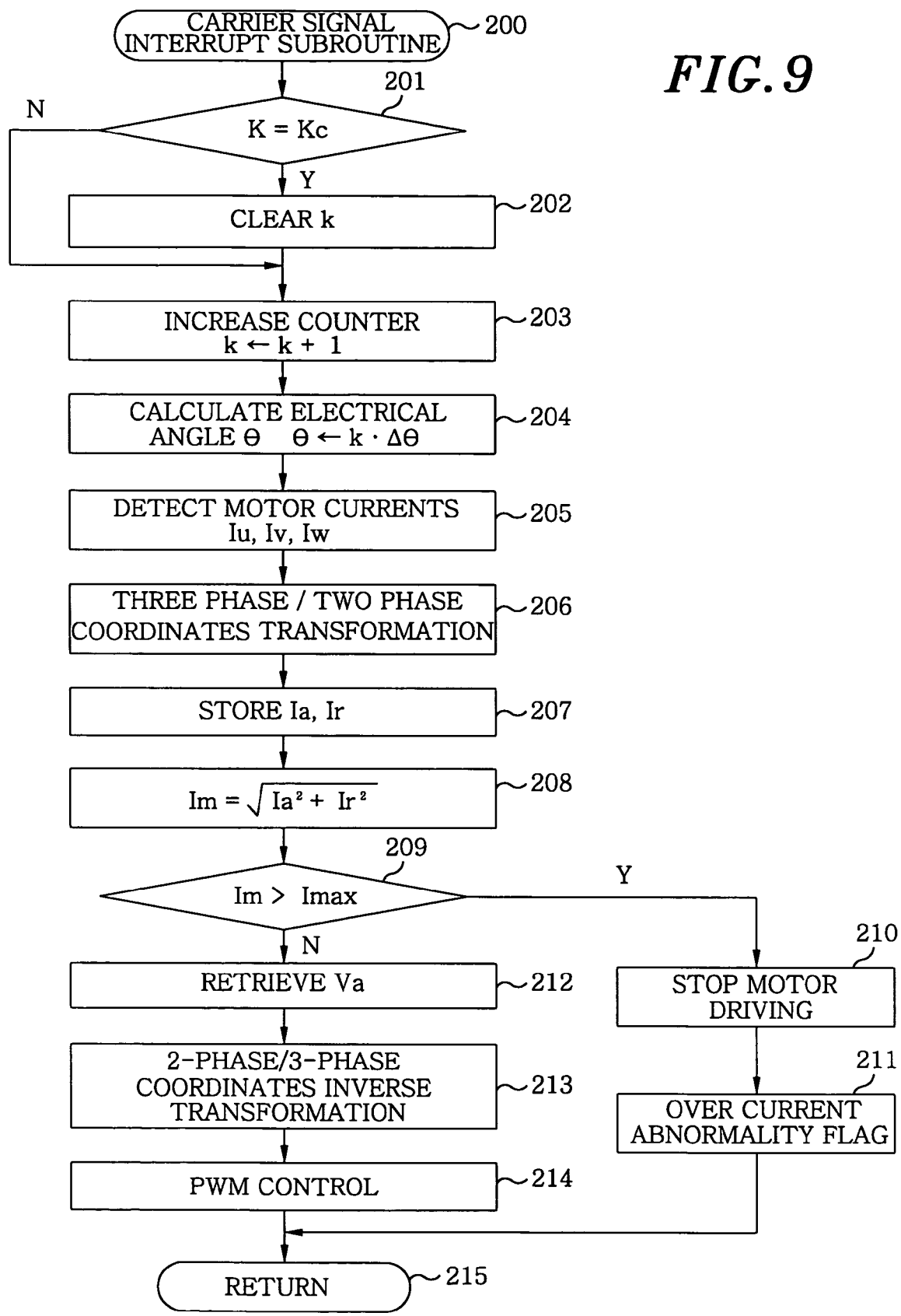
FIG. 9 is a flowchart that describes a carrier signal interrupt subroutine of the motor control program in accordance with the second preferred embodiment of the present invention.

Referring to FIG. 9, there is provided a detailed description of the carrier signal interrupt subroutine. A program is started in step 200, and it is determined in step 201 whether count k of carrier synchronization signals ck is equal to the number of carriers kc within one period of motor driving frequency f. If they are identical, carrier count k is cleared in step 202. The number of carriers kc within one period of motor driving frequency f is obtained in advance at a time of setting the driving frequency.

For example, when the rotation speed of an 8-polar motor is set to be 4040 rpm, driving frequency f and its period T are set to be 269.3 Hz and 3.712 msec, respectively. Further, when carrier period Tc is 64 μsec (carrier frequency of 15.6 kHz), the number of pulses kc becomes 58. When one period of the driving frequency f is set as $2\pi$, phase $\Delta\theta$ of one carrier period Tc is defined as $\Delta\theta=2\pi/kc$.

The count of the carrier synchronization signal is increased in step 203, and electrical angle θ is calculated from the number of carriers k and phase $\Delta\theta$ of one carrier period Tc in step 204. Thereafter, inverter output currents Iu, Iv and Iw are detected based on signals provided from the current detector 5 in step 205. Subsequently, three phase/two phase baseline axis coordinates transformation is performed by using Equation 2 to thereby obtain reactive current Ir and effective current Ia in step 206. Then, Ir and Ia are stored in step 207.

Next, absolute value Im of motor current vector is obtained by using Equation 3 in step 208 and, then, it is determined in step 209 whether calculated value Im is equal to or greater than over-current setting value Imax in step 209.

If calculated value Im is equal to or greater than over-current setting value Imax, driving of power semiconductors of inverter circuit 3 is ceased in step 210, to thereby stop the driving of the motor. Thereafter, an over-current abnormality flag is set in step 211.

If calculated value Im is smaller than over-current setting value Imax, inverter output control signal Va generated from a rotation speed control subroutine is retrieved in step 212, and, in step 213, a two phase/three phase baseline axis coordinates inverse transformation is conducted by using Equation 5 to obtain phase control signals vu, vv and vw of the inverter. Subsequently, a PWM control is performed in step 214, and, in step 215, the process returns.

Figure 10:
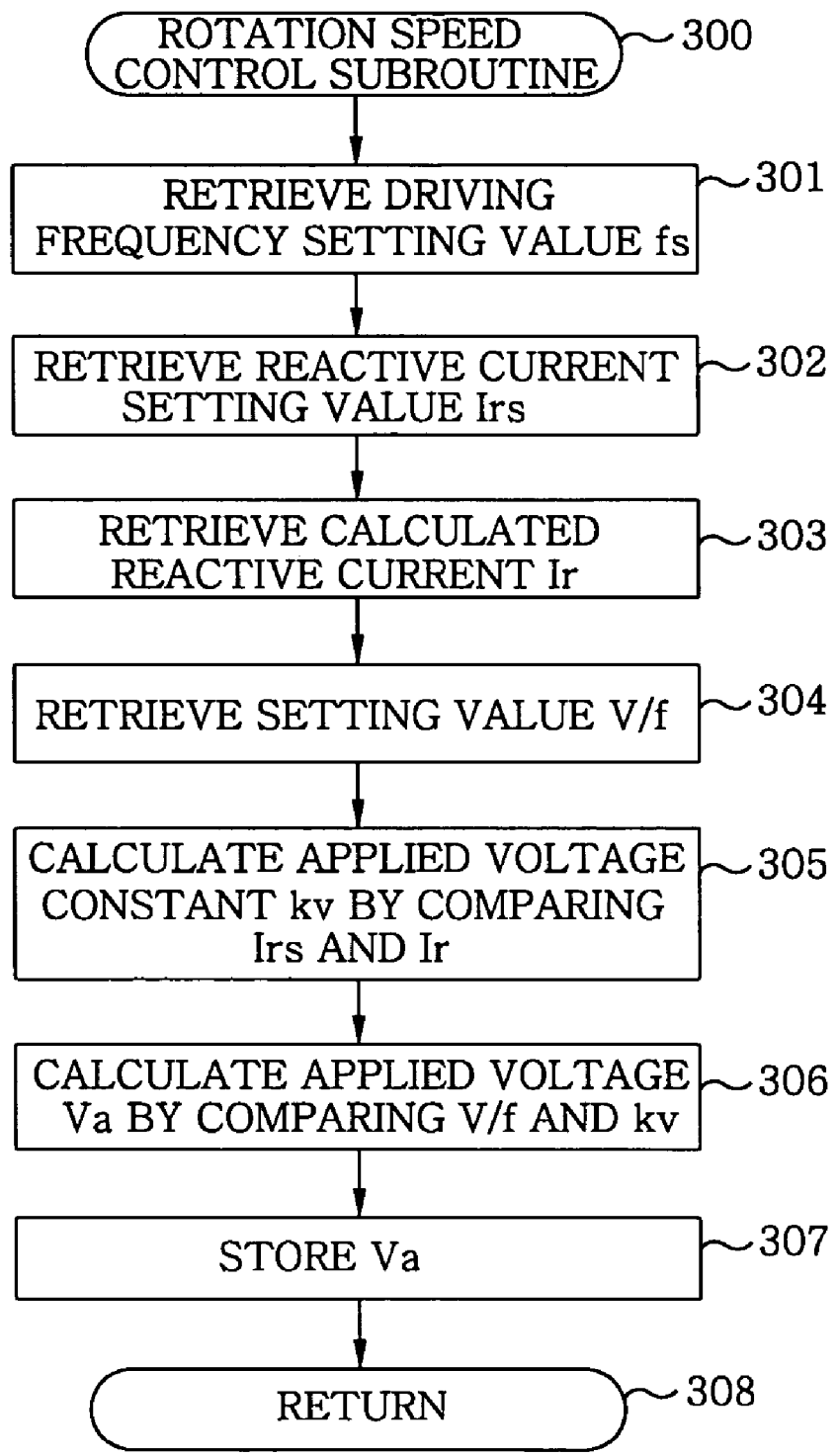
FIG. 10 provides a flowchart that describes a rotation speed control subroutine of the motor control program in accordance with the second preferred embodiment of the present invention.
Figure 11:
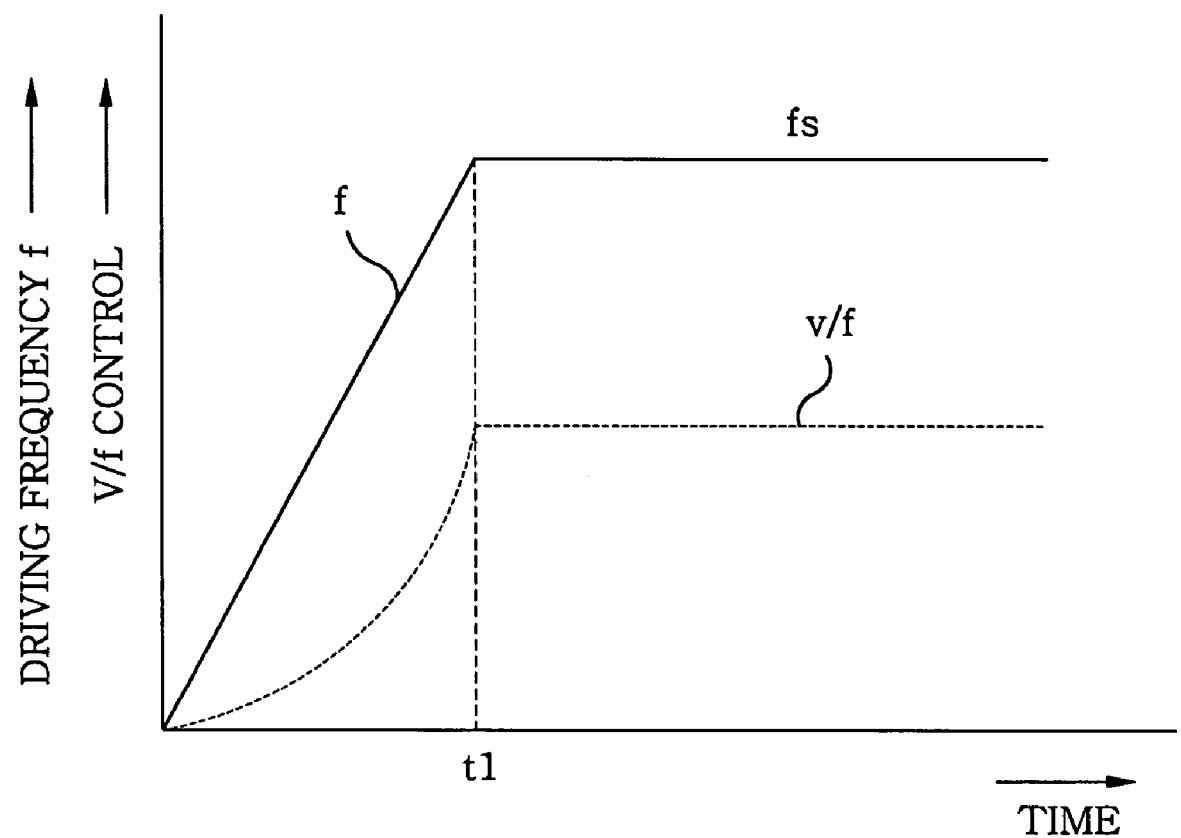
FIG. 11 offers a time chart that describes a start-up control of the motor driving apparatus for use in the dishwasher in accordance with the present invention.

FIG. 10 shows the rotation speed control subroutine. It is not necessary to perform the rotation speed control subroutine for every carrier signal but it may be conducted for every, e.g., two carrier signals. If a carrier frequency becomes an ultrasonic frequency, program processing time within one carrier period becomes critical, so that processes that should be conducted for every carrier signal, such as a phase calculation, a current detecting operation and a PWN control, and processes that need not be conducted for every carrier signal, such as a transformation of coordinates and a rotation speed control subroutine shown in FIG. 10 are distinguished from each other. Then, by dividing the processes that need not be executed for every carrier signal into a plurality of sub processes and performing them, a sequential program of dishwasher other than the motor control can be carried out.

As shown in FIG. 10, the rotation speed control subroutine is initiated in step 300, and setting value fs for driving frequency is called in step 301. Thereafter, setting value Irs for the reactive current corresponding to driving frequency setting value fs is called in step 302, and reactive current Ir obtained from the three phase/two phase base line axis coordinates transformation is called in step 303. Then, setting value V/f for applied voltage constant is called in step 304. Subsequently, comparison of Irs with Ir is conducted to obtain error signal ΔIr, from which applied voltage constant kv is calculated in step 305. Thereafter, in step 306, voltage signal applied to baseline axis Va is calculated from applied voltage constant setting value V/f and applied voltage constant kv obtained in step 305. Then, thus obtained Va is stored in step 307 and, in step 308, the process returns.

Referring back to the motor driving program shown in FIG. 8, it is determined in step 107 whether the current process is a drain pump driving process. If so, motor current Im is detected in step 108, and it is determined in step 109 whether motor current Im is smaller than setting value Ima. If Im is smaller than Ima, an air inflow detection flag is set in step 110, and the motor driving is stopped in step 111. Then, in step 112, the process returns.

Figure 13:
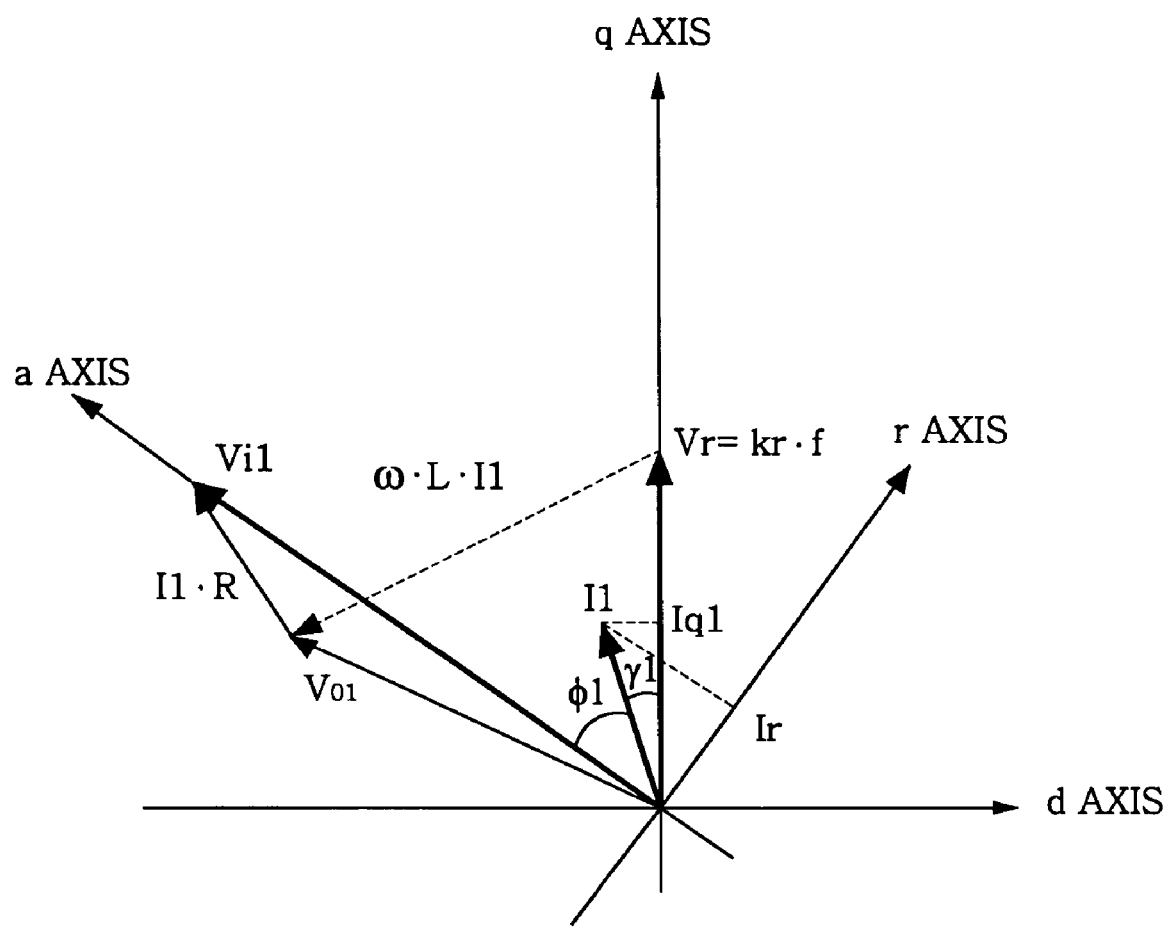
FIG. 13 is a control vector diagram of the motor driving apparatus for use in the dishwasher in accordance with the present invention, which is utilized when an inflow of air occurs.

FIG. 12 is for setting V/f, I sin φ and air inflow detection current level Ima corresponding to a pump driving rotation speed. As shown in FIG. 13, when the pump sucks in air, a load on the motor is decreased, and thus torque current Iq1 is reduced accordingly, resulting in a reduction of voltage Vi1 applied to the motor. At this time, since reactive current Ir is maintained to be constant, phase φ1 is increased and moved towards the q axis. As a result, an effective current of I1 is reduced.

During a drain pump driving process, when wash water is all drained from the washer tub by a water draining operation, an inflow of air occurs, which in turn increases noises during the water draining operation. Therefore, if the inflow of air is detected, the driving of motor is immediately stopped and is resumed after a lapse of a predetermined period of time to perform the water draining operation again. This process is repeated several times.

If an inflow of air is detected during a washing process, the rotation speed of motor may be lowered to thereby reduce the inflow of air. Further, since it may happen that cleaning efficiency is deteriorated if the amount of wash water is reduced, it is also preferable to reduce the inflow of air by way of increasing the quantity of wash water by supplying more water thereto while maintaining the rotation speed of motor. Further, both methods can be employed together.

Since the detection of the inflow of air can be accomplished more exactly based on motor current Im and phase φ obtained from Equation 4, it is preferable to detect the inflow of air based on the two data.

Furthermore, since the inflow of air results in a reduction in the load on the motor, the voltage applied to the motor (inverter output voltage) and the motor current are decreased. However, if the motor current is decreased, an operation for increasing a reactive current is performed. In such a case, a current envelope may vibrate greatly, resulting in an increase of amplitude of current. However, there also occur cases where the amplitude of current is rather reduced, and detection precision can be improved if the detection of the inflow of air is performed when the amplitude of current is reduced.

Moreover, the inflow of air can be detected by obtaining a difference between the maximum and the minimum of the current envelope as means for detecting a vibration of current or voltage.

As described above, the motor driving apparatus for use in a dishwasher in accordance with the present invention performs a sensorless sine wave driving of a brushless DC motor by detecting a current of an inverter circuit by means of a low-price current detector. Thus, since installation of a position sensor becomes unnecessary and highly efficient operation can be realized, the motor can be reduced in its size and thickness at a reduced price, while enhancing the reliability thereof.

Moreover, by detecting a current during a time duration separated far from a switching timing of a power transistor but by being synchronized with a carrier period, the current can be detected while the influence from switching noises is reduced. Further by employing a three shunt system, a carrier frequency can be successively detected even when the carrier frequency is in a supersonic frequency range.

Furthermore, since the coordinates transformation to an inverter output voltage baseline axis is carried out in synchronous with the carrier period, an absolute value of a current vector and a current phase or a reactive current can be instantaneously obtained. As a result, high-speed responsiveness can be obtained and stop of a motor can be prevented even in case where a sudden change such as an inflow of air into a pump occurs in a load on the motor.

In addition, an instantaneous detection of current can be achieved readily and the detection of the air inflow can be easily performed by observing a change in a motor current caused by a change in a load on the motor.

Further, though the preferred embodiments of the present invention have been described for the case of employing an SPM motor, same effects can be obtained even in case of using an IPM (interior permanent magnet) motor in which a permanent magnet is disposed within an iron core of a rotor.

Further, though the preferred embodiments of the present invention have been described for the case of regulating reactive current I sin φ to be constant, it is also possible to obtain same effects by way of regulating effective current I cos φ or phase φ to be maintained constant.

As described above, the motor driving apparatus for use in a dishwasher in accordance with the present invention converts an AC power to a DC power by a rectification circuit, drives a motor by means of an inverter circuit, detects an output current of the inverter circuit by using a current detector to thereby perform a PWM control of the inverter circuit such that a set rotation speed of the motor is obtained, and controls a phase difference between an output voltage and the output current of the inverter circuit or a reactive current to have a predetermined value. Therefore, a highly efficient sensorless sine wave driving of motor becomes feasible. Thus, the present invention can be applied to drive a motor for a drying fan in a washing and drying machine of dishwasher, a motor for a drying fan in a washing and drying machine, a motor for a pump for bath water and the like.

While the invention has been shown and described with respect to the preferred embodiments, it will be understood by those skilled in the art that various changes and modification may be made without departing from the spirit and scope of the invention as defined in the following claims.

What is claimed is:

1. An apparatus for driving a motor of a dishwasher comprising:
   an AC power source;
   a rectification circuit for converting an AC power from the AC power source to a DC power;
   an inverter circuit for converting the DC power from the rectification circuit to an AC power;
   a motor driven by the inverter circuit to drive a wash pump and/or a drain pump;

a current detector for detecting an output current of the inverter circuit; and a controller for performing a sinusoidal PWM (pulse width modulation) control of the inverter circuit based on an output signal of the current detector and a reactive current setting unit to thereby control the motor to rotate at a set rotation speed, wherein a reactive current to an inverter circuit output voltage is controlled to have a predetermined value.

2. The apparatus of claim 1, wherein the output current of the inverter circuit and an induced voltage of the motor are controlled to have a substantially identical phase by way of controlling the reactive current to the inverter circuit output voltage to have the predetermined value.

3. The apparatus of claim 1, further comprising a three phase/two phase coordinate transforming unit to provide the reactive current by performing a three phase/two phase transformation on instantaneous values of the inverter output currents to carry out the coordinate transformation to an axis of the inverter circuit output voltage and an orthogonal oriented axis.

* * * * *